(12) United States Patent
Looney et al.

(10) Patent No.: US 12,320,103 B2
(45) Date of Patent: Jun. 3, 2025

(54) HYDRANT COMPRISING A HYDRANT HOUSING AND A VALVE SEAT AND A METHOD FOR MOUNTING A VALVE SEAT IN A HYDRANT

(71) Applicant: AVK HOLDING A/S, Galten (DK)

(72) Inventors: Randall K. Looney, Minden, NV (US); Lawrence R. Montee, Silver Springs, NV (US); John H. Wilber, Littleton, CO (US)

(73) Assignee: AVK HOLDING A/S, Galten (DK)

( * ) Notice: Subject to any disclaimer, the term of this patent is extended or adjusted under 35 U.S.C. 154(b) by 0 days.

(21) Appl. No.: 18/562,379

(22) PCT Filed: May 20, 2021

(86) PCT No.: PCT/DK2021/050156
§ 371 (c)(1),
(2) Date: Nov. 20, 2023

(87) PCT Pub. No.: WO2022/242814
PCT Pub. Date: Nov. 24, 2022

(65) Prior Publication Data
US 2025/0084621 A1    Mar. 13, 2025

(51) Int. Cl.
*E03B 9/02* (2006.01)
*E03B 9/04* (2006.01)
(Continued)

(52) U.S. Cl.
CPC ........... *E03B 9/02* (2013.01); *E03B 9/04* (2013.01); *F16K 1/34* (2013.01); *F16K 1/425* (2013.01); *F16K 27/006* (2013.01)

(58) Field of Classification Search
CPC . E03B 9/02; E03B 9/04; F16K 27/006; F16K 1/34; F16K 1/425; F16K 1/427
(Continued)

(56) References Cited

U.S. PATENT DOCUMENTS

| 200,121 A | * | 2/1878 | Austin | E03B 9/02 |
| | | | | 251/270 |
| 1,572,033 A | * | 2/1926 | Parker | E03B 9/02 |
| | | | | 137/305 |

(Continued)

FOREIGN PATENT DOCUMENTS

| CN | 203395296 U | 1/2014 |
| EP | 2781663 A1 | 9/2014 |

OTHER PUBLICATIONS

International Search Report for corresponding application PCT/DK2021/050156 filed May 20, 2021; mail date Apr. 5, 2022.
(Continued)

*Primary Examiner* — Minh Q Le
(74) *Attorney, Agent, or Firm* — CANTOR COLBURN LLP

(57) ABSTRACT

Disclosed is a hydrant (1) comprising a hydrant housing (2) and a valve seat (3) arranged inside the hydrant housing (2). The hydrant (1) also comprises a valve body (4) resting against the valve seat (3) when the hydrant (1) is closed, wherein the valve seat (3) is arranged on an inner bayonet ring (5) being connected to an outer bayonet ring (6) through a bayonet coupling (7) and wherein the outer bayonet ring (6) is connected to the hydrant housing (2). A method for mounting a valve seat (3) in a hydrant (1) is also disclosed.

24 Claims, 5 Drawing Sheets

Figure 1:
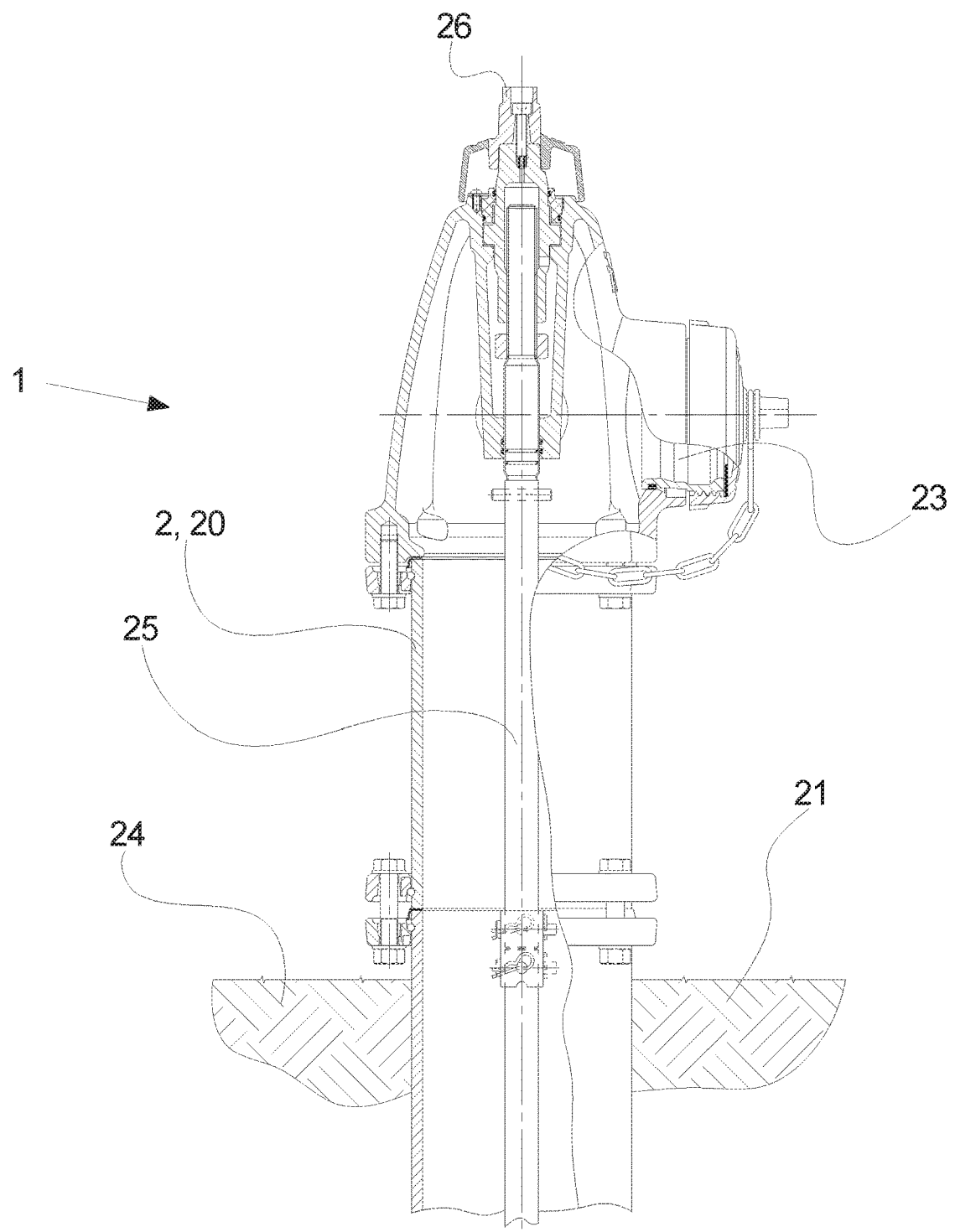

(51) Int. Cl.
 *F16K 1/34* (2006.01)
 *F16K 1/42* (2006.01)
 *F16K 27/00* (2006.01)

(58) Field of Classification Search
 USPC .... 137/15.18, 272, 280, 281, 283, 284, 285, 137/304, 305
 See application file for complete search history.

(56) References Cited

U.S. PATENT DOCUMENTS

| | | | |
|---|---|---|---|
| 2,078,782 A * | 4/1937 | Storey | E03B 9/14 |
| | | | 137/283 |
| 3,248,786 A * | 5/1966 | Smith | E03B 9/02 |
| | | | 29/213.1 |
| 3,267,952 A | 8/1966 | Pletcher et al. | |
| 3,899,196 A * | 8/1975 | Dashner | E03B 9/04 |
| | | | 285/422 |
| 6,058,957 A * | 5/2000 | Honigsbaum | F16K 35/022 |
| | | | 137/272 |
| 6,405,768 B1 | 6/2002 | McClaran | |
| 7,174,911 B2 * | 2/2007 | Davidson | F16K 15/18 |
| | | | 137/272 |
| 7,428,910 B2 * | 9/2008 | Davidson, Sr. | E03B 9/16 |
| | | | 137/272 |
| 11,180,905 B1 * | 11/2021 | Looney | F16K 27/006 |
| 2003/0193193 A1 * | 10/2003 | Harrington | F16L 37/252 |
| | | | 285/376 |
| 2006/0000092 A1 * | 1/2006 | Ingalls | E03B 9/04 |
| | | | 137/272 |
| 2008/0135100 A1 * | 6/2008 | Davidson | E03B 9/16 |
| | | | 137/15.02 |
| 2014/0261699 A1 * | 9/2014 | Gifford | F16K 1/422 |
| | | | 137/272 |
| 2020/0080290 A1 * | 3/2020 | Kennedy | E03B 9/02 |
| 2020/0087896 A1 * | 3/2020 | Kennedy | E03B 9/04 |
| 2020/0385960 A1 * | 12/2020 | Sitnikov | E03B 9/04 |
| 2021/0372099 A1 * | 12/2021 | Allen | F16K 39/024 |
| 2023/0399826 A1 * | 12/2023 | Choi | A62C 37/50 |

OTHER PUBLICATIONS

Written Opinion for corresponding application PCT/DK2021/050156 filed May 20, 2021; mail date Apr. 5, 2022.

* cited by examiner

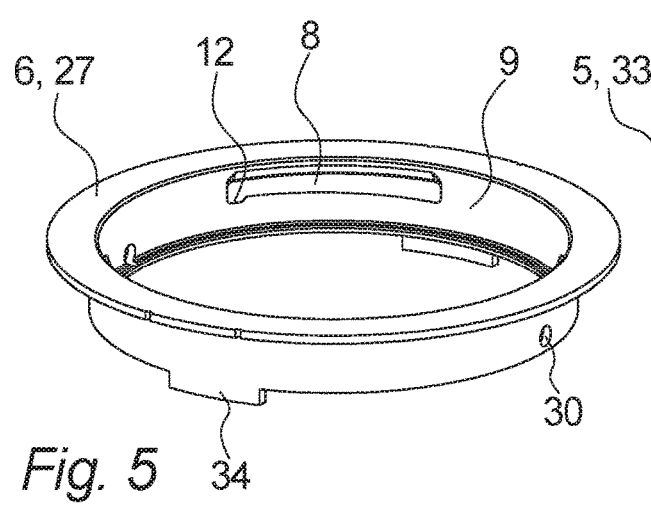
Fig. 5
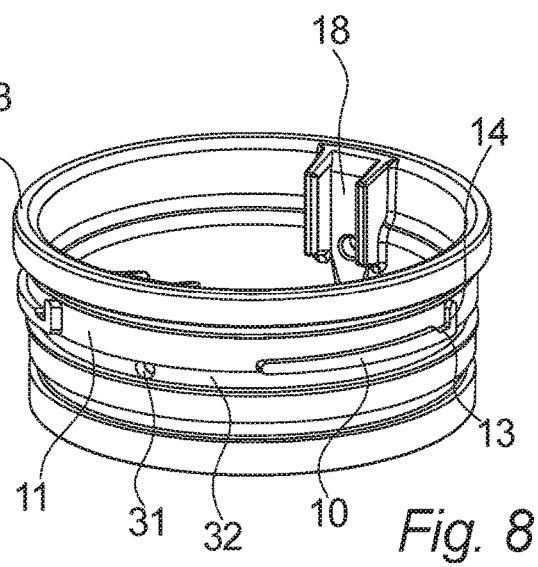
Fig. 8
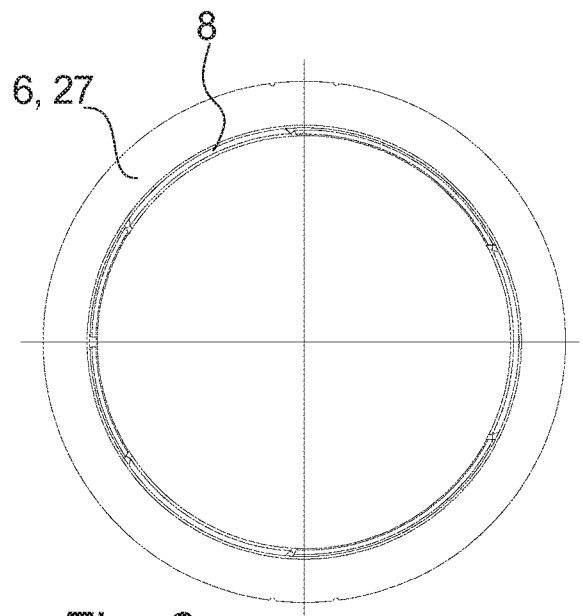
Fig. 6
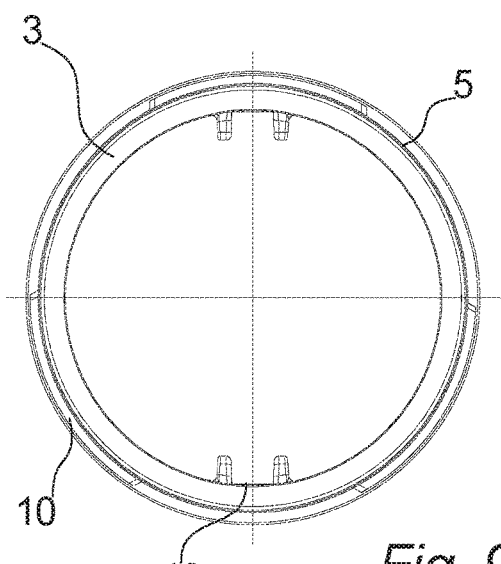
Fig. 9
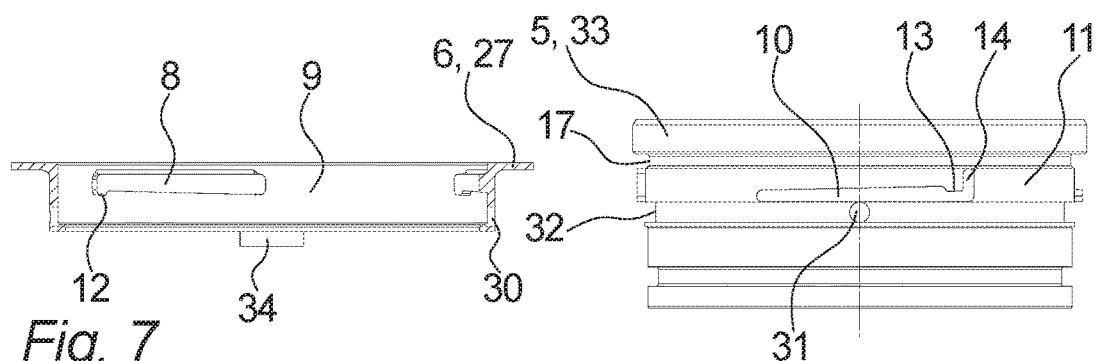
Fig. 7
Fig. 10

HYDRANT COMPRISING A HYDRANT HOUSING AND A VALVE SEAT AND A METHOD FOR MOUNTING A VALVE SEAT IN A HYDRANT

FIELD OF THE INVENTION

The invention relates to a hydrant comprising a hydrant housing and a valve seat arranged inside the hydrant housing. The hydrant also comprises a valve body resting against the valve seat when the hydrant is closed. The invention also relates to a method for mounting a valve seat in a hydrant.

BACKGROUND OF THE INVENTION

Hydrants, such as fire hydrants, are typically formed by means of a hydrant housing of which a part it is extending above ground and a part is extending beneath the ground to connect the hydrant to an underground waterpipe. Many types of hydrants exist but with dry barrel hydrants the water is drained or pumped from the barrel when the hydrant is not in use. Dry barrel hydrants are pressurized and drained through the workings of a main valve located in the base of the hydrant. When the main valve is opened, the barrel is pressurized and when the main valve is closed the barrel drains. This type of hydrant may be used almost anywhere but is especially suited to areas where freezing weather occurs.

In a dry barrel hydrant, typically a single main valve is located in the base of the hydrant at the water supply pipe and the main valve is typically located below the normal frost line to protect the hydrant from freezing. This allows the dry barrel hydrant to be used almost anywhere.

Dry barrel hydrants exist in different designs and in one type-often referred to as the compression type—the main valve body moves reciprocally on a vertical axis against a valve seat located in the hydrant base. The valve body moves against the valve seat to close and away from the seat to open. It is moved by a vertical actuation rod and the actuation rod moves up or down when an actuation nut located at the top of the hydrant is rotated.

However, over time the valve seat may deteriorate or be damaged and sometimes the valve seat needs to be replaced. From the European patent EP 2 781 663 B1 it is therefore known to attach the valve seat to the hydrant housing by means of a securing ring extending into a retaining groove in the hydrant housing, so that the valve seat may be replaced by means of a tool engaging the securing ring. However, this system is difficult to operate—particularly when the valve seat is located deep underground—and the system is vulnerable to dirt and other in the retaining groove.

An object of the invention is therefore to provide for an advantageous technique for mounting a valve seat in a hydrant.

The Invention

The invention provides for a hydrant comprising a hydrant housing and a valve seat arranged inside the hydrant housing. The hydrant also comprises a valve body resting against the valve seat when the hydrant is closed, wherein the valve seat is arranged on an inner bayonet ring being connected to an outer bayonet ring through a bayonet coupling and wherein the outer bayonet ring is connected to the hydrant housing.

Connecting the inner bayonet ring—holding the valve seat—to the outer bayonet ring through a bayonet coupling is advantageous in that a bayonet coupling is easy to connect and release in that it typically only requires a small rotation to connect or release the parts. Furthermore, a bayonet coupling is very durable in that the interconnecting parts can be formed relatively bulky.

And forming the outer bayonet ring as a separate part rigidly connected to the hydrant housing is advantageous in that the outer bayonet ring hereby can be formed in another material that the hydrant housing and/or in that the outer bayonet ring hereby can the manufactured separately e.g. with finer tolerances than the hydrant housing hereby simplifying manufacturing and reducing cost.

Furthermore, in a dry barrel hydrant a drain hole is typically provided just above the valve to ensure that the hydrant is drained when the valve is closed e.g. to prevent frost burst of the hydrant. Thus, locking the inner bayonet ring to the outer bayonet ring by means of a bayonet coupling ensures that the vertical (and rotational) position of the inner bayonet ring is well-defined in relation to the outer bayonet ring and thereby the hydrant housing. This is advantageous in that the drain hole extending through the inner bayonet ring and the outer bayonet ring will always be aligned when the bayonet coupling is fully engaged.

It should be noted that in this context the term "bayonet coupling" is to be understood as any kind of bayonet mount or bayonet connector comprising a fastening mechanism consisting of one part with a cylindrical side with one or more radial pins or lugs, and another part with a receptor with matching slot(s) or matching radial lug(s) that will secure the two parts against mutual axial displacement at least in one axial direction through interlocking geometry when the pins on one part are engaging the slots of the other part or the lugs on one part are engaging the lugs of the other part.

In an aspect of the invention, the bayonet coupling comprises an outer ring bayonet lug extending radially on an inner surface of the outer bayonet ring and an inner ring bayonet lug extending radially on an outer surface of the inner bayonet ring, wherein the outer ring bayonet lug or the inner ring bayonet lug is provided with a cam and wherein the other of the outer ring bayonet lug or the inner ring bayonet lug is provided with a socket arranged to accommodate the cam when the bayonet coupling is fully engaged.

Forming the bayonet coupling with radially extending lugs on both the inner bayonet ring and the outer ring bayonet is advantageous in that slots can hereby be avoided. Dirt, debris and other may settle in a slot and make it difficult to make the parts engage properly and to operate the bayonet coupling. Furthermore, it is advantageous to make one of the outer ring bayonet lug and the inner ring bayonet lug comprise a cam arranged to engage a socket on the other of the outer ring bayonet lug and the inner ring bayonet lug when the bayonet coupling is fully engaged in that the cam and socket will hinder that the inner bayonet ring and the outer ring bayonet are unintentionally rotated out of mutual engagement.

In an aspect of the invention, the outer bayonet ring comprises between two and five outer ring bayonet lugs and wherein the inner bayonet ring comprises the same number of inner ring bayonet lugs.

If the outer bayonet ring and the inner bayonet ring comprised only one bayonet lug each it is difficult to prevent the rings from tilting in relation to each other and if the outer bayonet ring and the inner bayonet ring comprised more than five bayonet lugs the parts would be unnecessarily difficult to manufacture. Thus, it is advantageous to make the inner bayonet ring and the outer bayonet ring each comprise between two and five bayonet lugs. And making the inner bayonet ring comprise the same number of bayonet lugs as the outer bayonet ring is advantageous in that this ensures a better and stronger hold.

In an aspect of the invention, the outer ring bayonet lugs are evenly spaced and wherein the inner ring bayonet lugs are evenly spaced.

Spacing the bayonet lugs evenly on the bayonet rings is advantageous in that this reduces the risk of the rings mutually tilting and it ensures a better, more uniform and stronger hold when the bayonet lugs are engaging.

In an aspect of the invention, the outer bayonet ring or the inner bayonet ring is provided with an axially extending stop lug arranged to prevent further rotation of the inner bayonet ring in relation to the outer bayonet ring in one direction when the bayonet coupling is fully engaged.

Forming an axially extending stop lug on the outer bayonet ring or the inner bayonet ring to prevent further rotation of the inner bayonet ring in relation to the outer bayonet ring in one direction when the bayonet coupling is fully engaged is advantageous in that it makes it easier to engage the bayonet coupling correctly—i.e. the inner bayonet ring is turned until the stop lug is hit, at which point the bayonet coupling is correctly engaging.

In an aspect of the invention, the bayonet coupling further comprises a resilient member arranged between the inner bayonet ring and the outer bayonet ring so that the resilient member is compressed when the bayonet coupling is fully engaged.

Arranging a resilient member arranged between the inner bayonet ring and the outer bayonet ring so that the resilient member is compressed when the bayonet coupling is fully engaged is advantageous in that the resilient member hereby will ensure that the bayonet coupling is better held in engagement and it will better prevent the inner bayonet ring and the outer bayonet ring from mutual tilting or rotation.

In an aspect of the invention, the resilient member comprises an O-ring, a gasket, or a spring.

Hereby is achieved an advantageous embodiment of the invention.

In an aspect of the invention, the resilient member is an O-ring made of rubber.

O-rings are simple and inexpensive and making it of rubber is advantageous in that rubber is a very resilient material that is durable and inexpensive.

In an aspect of the invention, the resilient member is arranged in a groove in the inner bayonet ring.

Arranging the resilient member in a groove in the inner bayonet ring is advantageous in that the resilient member hereby will follow the inner bayonet ring if this is pulled out of the hydrant. Hereby the resilient member can easily be inspected and/or replaced.

In an aspect of the invention, the outer diameter of the valve body is smaller than the inner diameter of the outer bayonet ring.

Forming the outer diameter (i.e. the maximum diameter) of the valve body smaller than the inner diameter (i.e. the minimum diameter) of the outer bayonet ring is advantageous in that the valve body hereby can be pulled up through the outer bayonet ring when the inner bayonet ring is disengaged-hereby enabling that valve seat may be located on an underside of the inner bayonet ring, whereby the water pressure will aid in maintaining the valve closed.

In an aspect of the invention, the inner diameter of the inner bayonet ring is smaller than the outer diameter of the valve body.

Forming the inner diameter of the inner bayonet ring so that it is smaller than the outer diameter of the valve body is advantageous in that this enables that valve body will rest against a valve seat arranged at an underside of the inner bayonet ring when the valve is closed, so that the water pressure may aid in keeping the valve closed.

In an aspect of the invention, the inner bayonet ring comprises axial grooves accommodating axial protrusions of the valve body to prevent mutual rotation between the inner bayonet ring and the valve body while allowing axial displacement of the valve body in relation to the inner bayonet ring.

The valve body has to be displaced in an axial direction in relation to inner bayonet ring to open and close the valve. However, it is also important to prevent mutual rotation between the inner bayonet ring and the valve body and it is therefore advantageous to provide the inner bayonet ring with axial grooves accommodating axial protrusions of the valve body to achieve this. Furthermore, by locking the inner bayonet ring and the valve body against mutual rotation it is possible to rotate the inner bayonet ring by rotating the valve body. This is advantageous in that the valve body is easier to engage and because the valve body can be rotated simply by rotating the actuation rod which is already extending to the top of the hydrant.

In an aspect of the invention, the outer bayonet ring is made from brass or bronze.

Brass and bronze are relatively inexpensive materials that are durable, strong, and easy to machine. It is therefore advantageous to make the outer bayonet ring from brass or bronze.

In an aspect of the invention, the inner bayonet ring is made from brass or bronze.

Brass and bronze are relatively inexpensive materials that are durable, strong and easy to machine. It is therefore advantageous to make the inner bayonet ring from brass or bronze.

In an aspect of the invention, the hydrant is a dry barrel style hydrant.

In a dry barrel style hydrant the valve—and thereby the valve seat—is located underground at the bottom end of the hydrant. I.e. in a dry barrel style hydrant the valve seat is very difficult to access in that this can only be done down through the barrel of the hydrant and it is therefore particularly advantageous to use the present invention in relation to dry barrel style hydrant.

In an aspect of the invention, the hydrant housing comprises an upper barrel and a lower barrel and wherein the outer bayonet ring is rigidly connected to the lower barrel.

The upper barrel of a hydrant housing is typically located above ground and it is connected to a lower barrel primarily located below ground. Thus, if the lower barrel is connected to the underground pipe supplying the water, it is advantageous that the outer bayonet ring is rigidly connected to the lower barrel.

In an aspect of the invention, the hydrant housing comprises an upper barrel, a lower barrel and an inlet base wherein the outer bayonet ring is rigidly connected to the inlet base.

In some embodiments the hydrant housing also comprises an inlet base connected to the bottom end of the lower barrel, wherein the underground pipe supping the water is connected to the inlet base. In such an embodiment it is advantageous that the outer bayonet ring is rigidly connected to the inlet base.

In an aspect of the invention, the outer bayonet ring is rigidly connected to the hydrant housing by being clamped between two or more parts of the hydrant housing.

Clamping a part of the outer bayonet ring between two or more parts of the hydrant housing is a simple and effective way of connecting the outer bayonet ring securely to the hydrant housing in a well-defined position.

In an aspect of the invention, the hydrant housing comprises an upper barrel, a lower barrel and an inlet base wherein the outer bayonet ring is connected to the hydrant housing by being clamped between the lower barrel and the inlet base.

The inlet base is the part of the hydrant housing being directly connected to the underground water supply pipe. If the inlet base is formed as a separate part of the hydrant housing and e.g. being bolted onto the lower barrel, clamping the outer bayonet ring between the lower barrel and the inlet base is a simple and effective way of connecting the outer bayonet ring securely to the hydrant housing in a well-defined position.

In an aspect of the invention, the hydrant comprises an outlet nozzle arranged at one end of the hydrant housing, wherein the valve seat is arranged at an opposite end of the hydrant housing and wherein the valve seat is arranged on the side of the inner bayonet ring facing away from the end of the hydrant housing comprising the outlet nozzle.

Forming the valve seat at the underside of the inner bayonet ring is advantageous in that the valve body then can be located below the valve seat so that the water pressure will aid in pressing the valve body against the valve seat when the valve is closed and thereby aid in maintaining the valve closed.

The invention further provides for a method for mounting a valve seat in a hydrant. The method comprises the steps of:
   connecting an outer bayonet ring to a hydrant housing of the hydrant,
   placing an inner bayonet ring comprising a valve seat in the outer bayonet ring, and
   rotating the inner bayonet ring in relation to the outer bayonet ring to connect the inner bayonet ring to the outer bayonet ring by means of a bayonet coupling.

Connecting a separate outer bayonet ring rigidly to the hydrant housing of the hydrant is advantageous in that this enables that the outer bayonet ring can be manufactured separate from the hydrant housing e.g. in a stronger material or in a material that is easier to machine and/or the outer bayonet ring can more easily be machined and/or be manufactured with finer tolerances.

In an aspect of the invention, the method further comprises arranging a resilient member between the inner bayonet ring and the outer bayonet ring so that the resilient member forces a cam of an outer ring bayonet lug or an inner ring bayonet lug into engagement with a socket on the other of the outer ring bayonet lug or the inner ring bayonet lug when the bayonet coupling is fully engaged.

Making a resilient member force a cam of the outer ring bayonet lug or an inner ring bayonet lug into engagement with a socket on the other of the outer ring bayonet lug or the inner ring bayonet lug is advantageous in that this will lock the inner bayonet ring and the outer bayonet ring against unintentional mutual rotation and thereby ensure that the two rings remain engaged.

In an aspect of the invention, the method further comprises compressing the resilient member while rotation the inner bayonet ring in relation to the outer bayonet ring.

Compressing the resilient member by applying an axial force is advantageous in that this enables that the cam can be pushed out of engagement with the socket and thereby enable that the inner bayonet ring may be rotated in relation to the outer bayonet ring to release the inner bayonet ring from the outer bayonet ring.

In an aspect of the invention, the previously discussed method is performed on a hydrant according to any of the previously discussed hydrants.

Hereby is achieved an advantageous embodiment of the invention.

FIGURES

Figure 2:
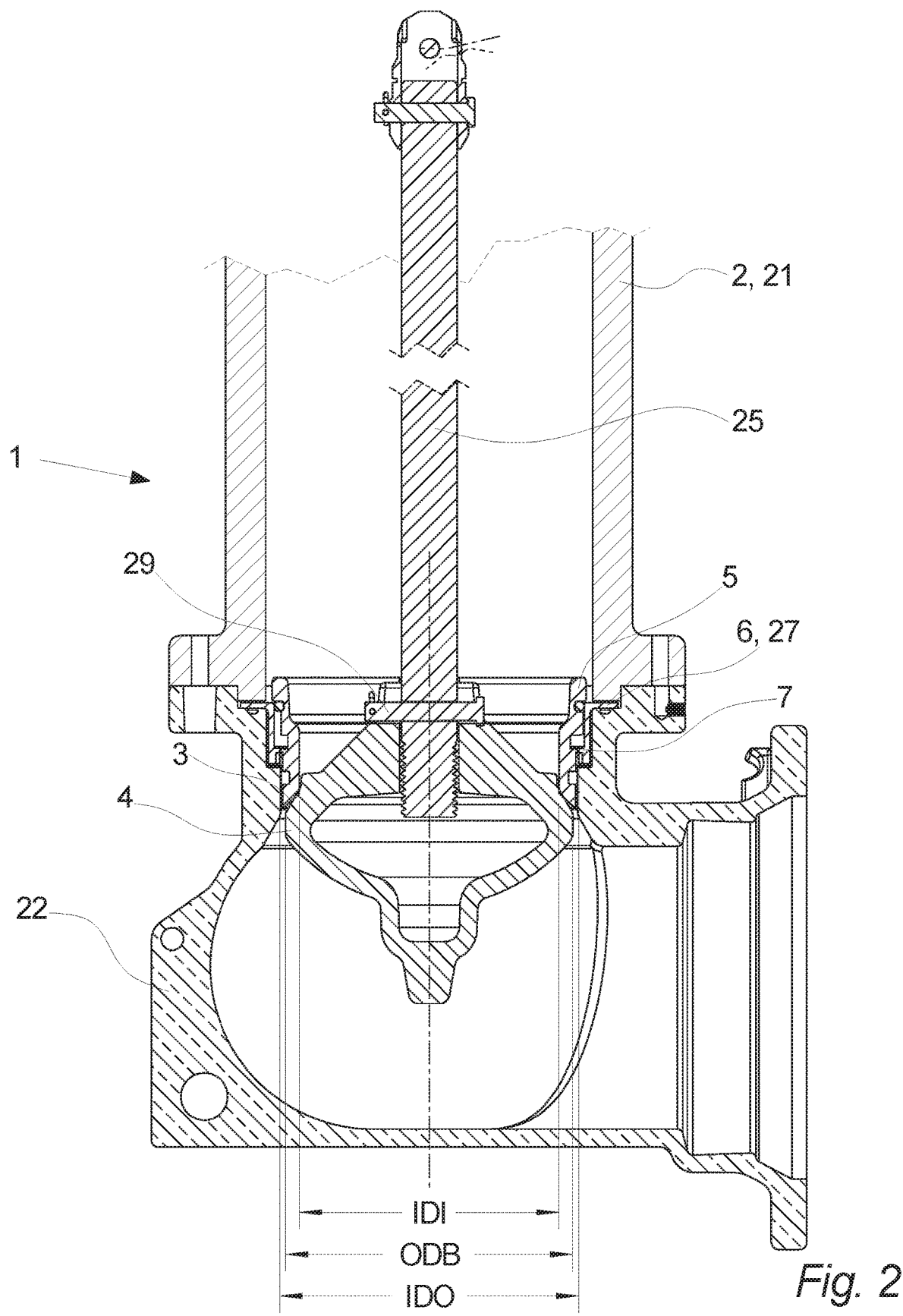
Figures 3, 4:
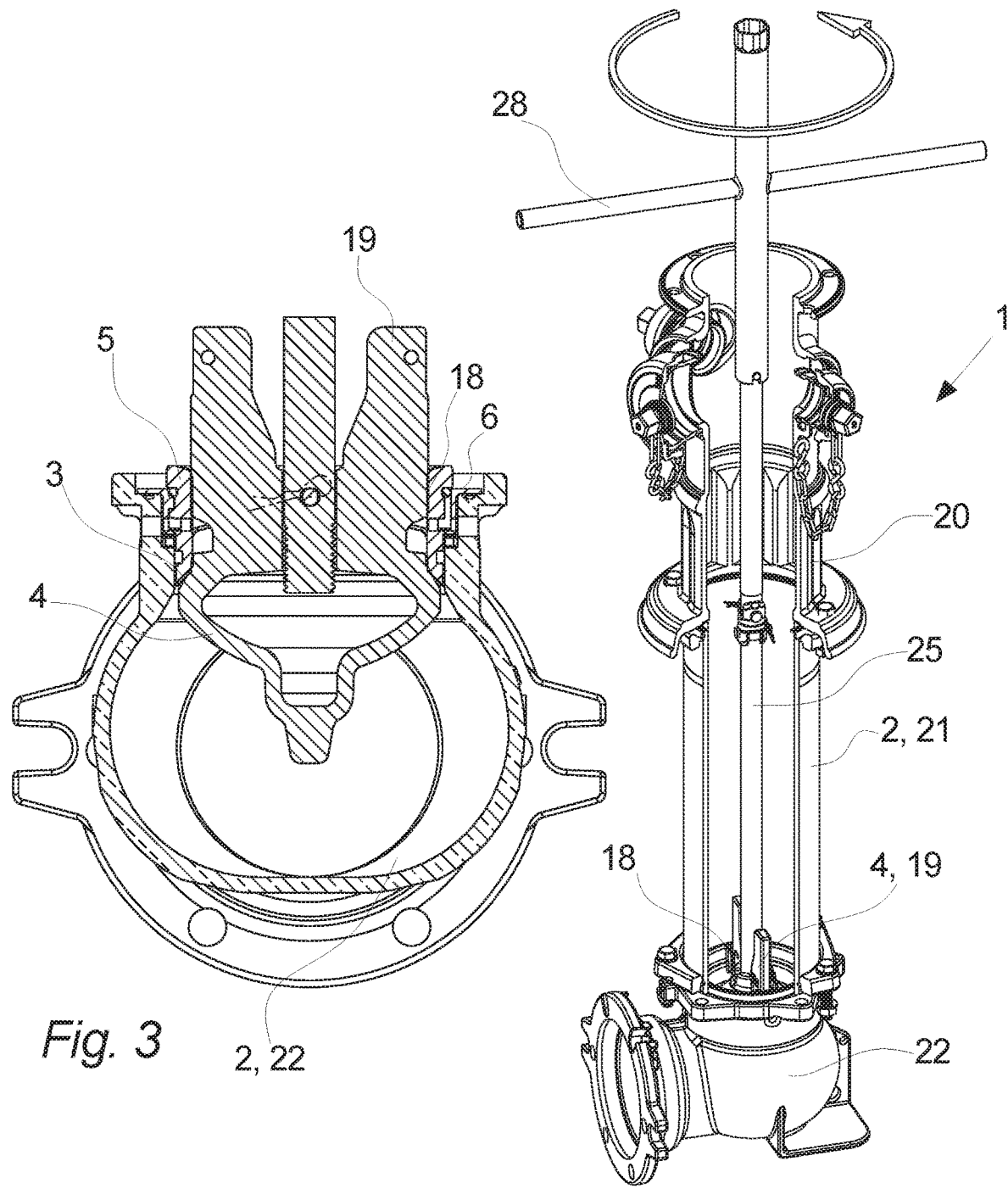
Figure 11:
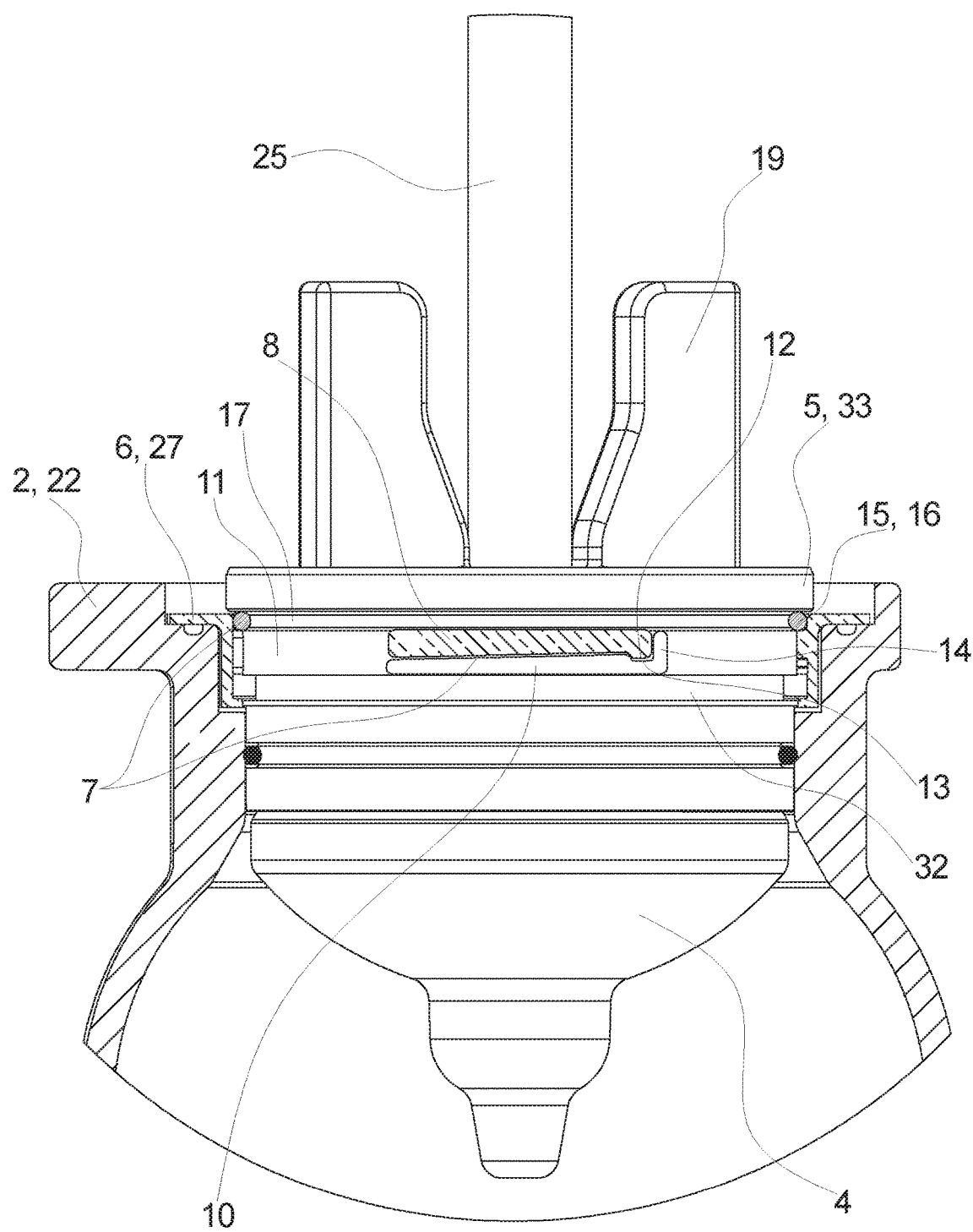

An embodiment of the invention will be described, by way of non-limiting example, in the following with reference to the figures in which:

FIG. 1 illustrates a partial cross section through the top part of a dry barrel hydrant, as seen from the side, FIG. 2 illustrates a cross section through the bottom part of a dry barrel hydrant, as seen from the side, FIG. 3 illustrates a cross section through the bottom part of a dry barrel hydrant, as seen from the front, FIG. 4 illustrates a partial cross section through a dry barrel hydrant, as seen in perspective, FIG. 5 illustrates an embodiment of an outer bayonet ring, as seen in perspective, FIG. 6 illustrates an embodiment of an outer bayonet ring, as seen from the bottom, FIG. 7 illustrates a cross section through an embodiment of an outer bayonet ring, as seen from the side, FIG. 8 illustrates an embodiment of an inner bayonet ring, as seen in perspective, FIG. 9 illustrates an embodiment of an inner bayonet ring, as seen from the bottom, FIG. 10 illustrates a cross section through an embodiment of an inner bayonet ring, as seen from the side, and FIG. 11 illustrates a cross section through an outer bayonet ring enclosing an inner bayonet ring, as seen from the side.

DETAILED DESCRIPTION

FIG. 1 illustrates a partial cross section through the top part of a dry barrel hydrant 1, as seen from the side.

In this embodiment the hydrant 1 is designed such that it may be operated from above the ground surface 16 so that e.g. firefighters may easily obtain access to the water supply by attaching a fire hose to the outlet nozzle 23.

As seen on the figure, the hydrant 1 is a relatively standard dry barrel hydrant comprising a hydrant housing 2 comprising an upper barrel 20 extending above ground 24 and a lower barrel 21 extending in the ground down to the supply water pipe. In this embodiment the hydrant 1 also comprises an actuation rod 25 extending down and towards a valve body 4 (see FIG. 2), so that the flow of water from an underground water pipe and up through the hydrant 1 may be regulated depending on the position of the valve body 4.

In this embodiment an actuation nut 26 is extending downwards and is engaging the actuation rod 25 through a threaded connection so that when the actuation nut 26 is rotated, the actuation rod 25 is pushed downwards or pulled upwards depending on the direction of rotation.

I.e. in this embodiment, the hydrant 1 is a dry barrel hydrant in that the area between the valve body 4 and the outlet nozzle 23 is normally not filled with water (and therefore dry). However, in another embodiment, the hydrant 1 could be another type of a dry barrel hydrant or it could be another type of hydrant 1 where the main valve is located underground.

FIG. 2 illustrates a cross section through the bottom part of a dry barrel hydrant 1, as seen from the side.

In this embodiment the bottom part of the hydrant 1 comprises the valve body 4 arranged below a valve seat 3 so that the valve body 4 may be drawn up against the valve seat 3 by means of the actuation rod 25 to close the valve—i.e., so that the water from a water supply pipe (not shown) may not flow up through the hydrant 1. And if the valve body 4 is pushed downwards away from the valve seat 3, water is allowed to flow up through the hydrant 1. Thus, when the actuation nut 26 is rotated, the actuation rod 25 travels up and down to pull or push the valve body 4 up and down and thereby the flow of water up into the upper part of the hydrant 1 may be adjusted. When the valve body 4 is arranged below the valve seat 3, the water pressure in the water supply pipe will aid in pressing the valve body 4 against the valve seat 3 when the valve is closed. Thus, in this embodiment the valve seat 3 is arranged on the side of the inner bayonet ring 5 facing away from the end of the hydrant housing 2 comprising the outlet nozzle 23 and in this embodiment the inner diameter IDI of the inner bayonet ring 5 is smaller than the outer diameter ODB of the valve body 4 so that the valve seat 3 can be formed as a surface at an underside of the inner bayonet ring 5. However, in another embodiment the valve body 4 could be arranged above the valve seat 3—and the valve seat 3 could be facing upwards toward the end of the end of the hydrant housing 2 comprising the outlet nozzle 23—so that the water pressure would aid in pushing the valve body 4 away from the valve seat 3 when the valve is being opened. And/or in another embodiment the valve seat 3 could be formed as a separate part being connected to the inner bayonet ring 5 e.g. enabling that only the inner diameter of the valve seat 3 is smaller than the outer diameter ODB of the valve body 4.

In this embodiment the valve body 4 is formed as a plug made from ductile iron encapsulated in EPDM rubber (ethylene propylene diene monomer rubber) but in another embodiment the valve body 4 could also or instead be formed in numerous other ways, such as a valve disk, a valve ball or other and/or it could be made from rubber, stainless steel, brass, plastic or other or any combination thereof.

In this embodiment the hydrant housing 2 also comprises a lower barrel 21 connected to the upper barrel 20 at the upper end and the hydrant housing 2 comprises an inlet base 22 connected to the lower end of the lower barrel 21. In another embodiment the hydrant housing 2 could be formed from a single part, the lower barrel 21 could be connected directly to the water supply pipe (i.e. no inlet base is present), the hydrant housing 2 could comprise further parts—such as further barrel element, intermediate flanges or other—and/or the hydrant housing 2 could be formed in numerous other ways.

In this embodiment the valve seat 3 is placed on an inner bayonet ring 5 which is connected to an outer bayonet ring 6 through a bayonet coupling 7 which will be discussed further in the following.

In this embodiment the outer bayonet ring 6 is connected to the hydrant housing 2 in that the outer bayonet ring 6 comprises an outer bayonet ring flange 27 being clamped between the lower barrel 21 and the inlet base 22. However, in another embodiment the outer bayonet ring 6 could be connected to the hydrant housing 2 by means of screws, bolts, rivets, adhesive or other or any combination thereof and/or the outer bayonet ring 6 could be connected to another part of the hydrant housing 2—such as only to the inlet base 22, only the lower barrel 21, to an intermediate hydrant housing part or other or any combination thereof.

In this embodiment both the outer bayonet ring 6 and the inner bayonet ring 5 are made from bronze but in another embodiment one or both of the outer bayonet ring 6 and the inner bayonet ring 5 could be made at least partly from a plastic material, a composite material, ceramic, or from brass, stainless steel or another metal.

In this embodiment the outer diameter ODB of the valve body 4 is smaller than the inner diameter IDO of the outer bayonet ring 6 so that when the inner bayonet ring 5 is released from the outer bayonet ring 6 the valve body 4 may be pulled up and out of the hydrant 1 while the outer bayonet ring 6 is still connected to the hydrant housing 2.

In this embodiment the valve body 4 is connected to the actuation rod 25 by means of connection means 29 which also lock the valve body 4 and the actuation rod 25 against mutual rotation. In this embodiment the connection means 29 comprises a locking pin extending through holes in the valve body 4 and the actuation rod 25 but in another embodiment the connection means 29 could also or instead comprise interlocking geometry, screws, bolts, rivets, adhesive, threaded connections or other.

FIG. 3 illustrates a cross section through the bottom part of a dry barrel hydrant 1, as seen from the front.

In this embodiment the inner bayonet ring 5 comprises axial grooves 18 (see also FIG. 8) in which axial protrusions 19 of the valve body 4 may slide to prevent mutual rotation between the inner bayonet ring 5 and the valve body 4 while still allowing axial displacement of the valve body 4 in relation to the inner bayonet ring 5. In this embodiment the axial protrusions 19 are formed as two fins protruding upwards from the valve body 4 and being accommodated in two corresponding axial grooves 18 in the inner bayonet ring 5 but in another embodiment the hydrant 1 could comprise another matching number of axial grooves 18 and axial protrusions 19 and/or the axial protrusions 19 could be formed as pins, rods, disks or other and/or the axial grooves 18 could be formed as tracks, indentations, holes or other.

FIG. 4 illustrates a partial cross section through a dry barrel hydrant 1, as seen in perspective.

In this embodiment the top of the hydrant housing 2 is removed so that an upper end of the actuation rod 25 may be engaged by means of a mounting tool 28—in this case in the form of a T-wrench. Since the inner bayonet ring 5 and the valve body 4 are locked against mutual rotation by means of the axial protrusions 19 engaging the axial grooves 18 and since the actuation rod 25 and the valve body 4 are locked against mutual rotation by means of the connection means 29 (see FIG. 2), the inner bayonet ring 5 will rotate when the actuation rod 25 is rotated in the correct direction. Thus, in this embodiment the inner bayonet ring 5 can be released from the outer bayonet ring 6 by rotating the actuation rod 25 in one direction to disengage the bayonet coupling 7 after which the inner bayonet ring 5 and the valve body 4 can be pulled up and out of the hydrant housing 2 without having to unearth the hydrant 1. And when mounting the inner bayonet ring 5 and the valve body 4 the process is reversed.

In dry barrel hydrants 1 the valve is almost always located below the frost line of the ground 24 where the hydrant 1 has been installed and this means that the inner bayonet ring 5 and the outer bayonet ring 6 can be situated as much as 6 meters deep underground. It is therefore advantageous to mount and dismount the inner bayonet ring 5 and the valve body 4 by means of the actuation rod 25 in that this reduces the size of and simplifies the design of the mounting tool 28.

FIG. 5 illustrates an embodiment of an outer bayonet ring 6, as seen in perspective, FIG. 6 illustrates an embodiment of an outer bayonet ring 6, as seen from the bottom, and FIG. 7 illustrates a cross section through an embodiment of an outer bayonet ring 6, as seen from the side.

In this embodiment the outer bayonet ring 6 comprises three evenly spaced outer ring bayonet lugs 8 forming part of the bayonet coupling 7 (see FIG. 11). The outer ring bayonet lugs 8 are extending radially on the inner surface 9 of the outer bayonet ring 6 and the outer ring bayonet lugs 8 are provided with a cam 12 arranged to engage the matching socket 13 of the inner ring bayonet lugs 10 (see also FIG. 11) when the bayonet coupling 7 is fully engaged. In this embodiment each of the outer ring bayonet lugs 8 extend around 55° of the outer bayonet ring 6 but in another embodiment the outer ring bayonet lugs 8 could extend 45°, 30°, 20° or even less or the outer ring bayonet lugs 8 could extend 60°, 85°, 120° or even more e.g. depending on the number of outer ring bayonet lugs 8, which in another embodiment could be one, two, five, eight or even more and/or not evenly spaced.

In this embodiment the outer bayonet ring 6 is further provided with a downward protrusion 34 arranged to further connect the outer bayonet ring 6 to the hydrant housing 2 by protruding down into a matching cavity (not shown) in the hydrant housing 2.

FIG. 8 illustrates an embodiment of an inner bayonet ring 5, as seen in perspective, FIG. 9 illustrates an embodiment of an inner bayonet ring 5, as seen from the bottom, and FIG. 10 illustrates a cross section through an embodiment of an inner bayonet ring 5, as seen from the side.

In this embodiment the inner bayonet ring 5 comprises three evenly spaced inner ring bayonet lugs 10 forming part of the bayonet coupling 7 (see FIG. 11). The inner ring bayonet lugs 10 are extending radially on the outer surface 11 of the inner bayonet ring and the inner ring bayonet lugs 10 are provided with a socket 13 arranged to engage the matching cam 12 of the outer ring bayonet lugs 8 (see also FIG. 11) when the bayonet coupling 7 is fully engaged. However, in another embodiment the cam 12 could be provided on the inner ring bayonet lugs 10 and the socket 13 could be provided on the outer ring bayonet lugs 8, both or neither of the inner ring bayonet lugs 10 and the outer ring bayonet lugs 8 could be provided with a cam 12 and a socket 13 and/or the partly interlocking quality of the cam 12 and socket 13 could be enabled in another way.

In this embodiment each of the inner ring bayonet lugs 10 extends around 55° of the inner bayonet ring 5 to substantially match the radial extend of the outer ring bayonet lugs 8 but in another embodiment the inner ring bayonet lugs 10 could extend 45°, 30°, 20° or even less or the inner ring bayonet lugs 10 could extend 60°, 85°, 120° or even more e.g. depending on the number of inner ring bayonet lugs 10, which in another embodiment could be one, two, five, eight or even more and/or not evenly spaced as long as the number and the spacing are matching the number and spacing of the outer ring bayonet lugs 8.

In this embodiment the inner bayonet ring 5 is also provided with an axially extending stop lug 14 formed integrally with the inner ring bayonet lugs 10 to prevent further rotation of the inner bayonet ring 5 in relation to the outer bayonet ring 6 in the closing direction when the bayonet coupling 7 is fully engaged. However, in another embodiment the stop lug 14 could be formed separate from the inner ring bayonet lugs and/or only one stop lug 14 would be provided and/or the stop lug(s) could be provided on the outer bayonet ring 6.

In this embodiment the outer bayonet ring 6 is provided with two outer ring drain holes and the inner bayonet ring 5 is provided with two matching inner ring drain holes 31 which has to be in fluid communication to ensure that the hydrant is drained when it is closed. However, in another embodiment outer bayonet ring 6 and/or the inner bayonet ring 5 could be provided with another number of drain holes 30, 31, such as one, three, five or even more. In this embodiment the inner ring drain holes 31 are formed in a drain groove 32 in the outer surface 11 of the of the inner bayonet ring 5 but the outer ring drain holes 30 still have to be vertically aligned with the drain groove 32 which is ensured by the bayonet coupling 7.

FIG. 11 illustrates a cross section through the outer bayonet ring 6 enclosing the inner bayonet ring 5, as seen from the side.

In this embodiment the inner bayonet ring 5 is mounted in the outer bayonet ring 6 so that the inner ring bayonet lugs 10 is engaging the outer ring bayonet lugs 8 and the bayonet coupling 7 thereby is fully engaged. Note that the cross section in this view is not straight to enable that it can be shown that the inner ring bayonet lug 10 is engaging the outer ring bayonet lug 8.

In this embodiment the bayonet coupling 7 further comprises a resilient member 15 arranged between the inner bayonet ring 5 and the outer bayonet ring 6 and the resilient member 15 is at least slightly compressed when the bayonet coupling 7 is fully engaged so that the resilient member 15 in engaged state will force the bottom one of outer ring bayonet lugs 8 and the inner ring bayonet lugs 10 (in this case the inner ring bayonet lugs 10) up against the top one (in this case the outer ring bayonet lugs 8) or vice versa. In this embodiment the resilient member 15 is arranged in a groove 17 in the inner bayonet ring 5 so that the resilient member 15 is compressed between the outer ring bayonet lugs 8 and an inner bayonet ring flange 33 at the top of the inner bayonet ring 5. However, in another embodiment the resilient member could be arranged elsewhere on the inner bayonet ring 5, elsewhere on the outer bayonet ring 6 and/or the bayonet coupling 7 could comprise more than one resilient member 15 e.g. arranged on both the inner bayonet ring 5 and the outer bayonet ring 6.

In this embodiment the resilient member 15 is an O-ring 16 made of rubber so that the resilient member 15 can also act as a seal preventing water from passing the resilient member 15 but in another embodiment the resilient member 15 could also or instead comprise a gasket, a flexible washer, a spring or other or any combination thereof and/or the resilient member 15 could be made from plastic, metal, or another material.

In this embodiment the valve seat 3 is mounted in the hydrant 1 by first connecting the outer bayonet ring 6 to the hydrant housing 2 as previously discussed. This will typically take place during assembly of the hydrant 1 either at a manufacturing place or in situ when the hydrant 1 is installed. In case of installing a new hydrant 1 the entire hydrant 1 could be installed fully assembled but it could also be installed in parts. If the hydrant 1 is assembled in situ or if the valve seat 3 or the valve body 4 subsequently had to be inspected or replaced, the inner bayonet ring 5 could be mounted or remounted by placing the inner bayonet ring 5 comprising the valve seat 3 in the outer bayonet ring 6 and rotating the inner bayonet ring 5 in relation to the outer bayonet ring 6 to connect the inner bayonet ring 5 to the outer bayonet ring 6 by means of the bayonet coupling 7—i.e. to make the inner ring bayonet lugs 10 rotate in under the outer ring bayonet lugs 8 so that the inner bayonet ring 5 cannot be displaced vertically.

In this embodiment, mounting the valve seat 3 in the hydrant 1 also comprises arranging the resilient member 15 between the inner bayonet ring 5 and the outer bayonet ring 6 so that the resilient member 15 forces the cam 12 of the outer ring bayonet lug 8 into engagement with the socket 13 on the inner ring bayonet lug 10 when the bayonet coupling 7 is fully engaged. I.e. in this embodiment the inner bayonet ring 5 is forced down to compress the resilient member 15 when the inner bayonet ring 5 is rotated into engagement with the outer bayonet ring 6. Once the bayonet coupling 7 is fully engaged the downward force is released and the resilient member 15 will expand slightly in the vertical direction to force the inner ring bayonet lugs 10 up against the outer ring bayonet lugs 8. Likewise, when disconnecting the inner bayonet ring 5 from the outer bayonet ring 6, the inner bayonet ring 5 is forced downwards while being rotated. In this embodiment the compression force is at least partly provided through the design of the outer ring bayonet lugs 8, the inner ring bayonet lugs 10, the cam 12 and the socket 13 in that mating surfaces of these parts 8, 10, 12, 13 are formed sloping so that the downward force gradually increases while the inner bayonet ring 5 is rotated into engagement. However, in another embodiment this downward force could be provided solely by the operator mounting or dismounting the inner bayonet ring 5.

It should be noted that any reference to direction throughout this application—such as upper, lower, bottom, top, up, down etc.—refers to the orientation of the hydrant 1 during normal use where the hydrant housing 2 is extending from above ground and down to an underground water supply pipe.

The invention has been exemplified above with reference to specific examples of hydrants 1, valve bodies 4, bayonet couplings 7 and other. However, it should be understood that the invention is not limited to the particular examples described above but may be designed and altered in a multitude of varieties within the scope of the invention as specified in the claims.

LIST

1. Hydrant
2. Hydrant housing
3. Valve seat
4. Valve body
5. Inner bayonet ring
6. Outer bayonet ring
7. Bayonet coupling
8. Outer ring bayonet lug
9. Inner surface of outer bayonet ring
10. Inner ring bayonet lug
11. Outer surface of inner bayonet ring
12. Cam
13. Socket
14. Stop lug
15. Resilient member
16. O-ring
17. Groove in inner bayonet ring
18. Axial groove of inner bayonet ring
19. Axial protrusion of valve body
20. Upper barrel
21. Lower barrel
22. Inlet base
23. Outlet nozzle
24. Ground
25. Actuation rod
26. Actuation nut
27. Outer bayonet ring flange
28. Mounting tool
29. Connection means
30. Outer ring drain hole
31. Inner ring drain hole
32. Drain groove
33. Inner bayonet ring flange
34. Downward protrusion
ODB. Outer diameter of valve body
IDO. Inner diameter of outer bayonet ring
IDI. Inner diameter of inner bayonet ring

The invention claimed is:

1. A hydrant comprising
a hydrant housing,
a valve seat arranged inside said hydrant housing,
a valve body resting against said valve seat when said hydrant is closed,
wherein said valve seat is arranged on an inner bayonet ring being connected to an outer bayonet ring through a bayonet coupling and wherein said outer bayonet ring is connected to said hydrant housing.

2. The hydrant according to claim 1, wherein said bayonet coupling comprises an outer ring bayonet lug extending radially on an inner surface of said outer bayonet ring and an inner ring bayonet lug extending radially on an outer surface of said inner bayonet ring, wherein said outer ring bayonet lug or said inner ring bayonet lug is provided with a cam and wherein the other of said outer ring bayonet lug or said inner ring bayonet lug is provided with a socket arranged to accommodate said cam when said bayonet coupling is fully engaged.

3. The hydrant according to claim 2, wherein said outer bayonet ring comprises between two and five outer ring bayonet lugs and wherein said inner bayonet ring comprises the same number of inner ring bayonet lugs.

4. The hydrant according to claim 3, wherein said outer ring bayonet lugs are evenly spaced and wherein said inner ring bayonet lugs are evenly spaced.

5. The hydrant according to claim 1, wherein said outer bayonet ring or said inner bayonet ring is provided with an axially extending stop lug arranged to prevent further rotation of said inner bayonet ring in relation to said outer bayonet ring in one direction when said bayonet coupling is fully engaged.

6. The hydrant according to claim 1, wherein said bayonet coupling further comprises a resilient member arranged between said inner bayonet ring and said outer bayonet ring so that said resilient member is compressed when said bayonet coupling is fully engaged.

7. The hydrant according to claim 6, wherein said resilient member comprises an O-ring, a gasket, or a spring.

8. The hydrant according to claim 7, wherein said resilient member is an O-ring made of rubber.

9. The hydrant according to claim 6, wherein said resilient member is arranged in a groove in said inner bayonet ring.

10. The hydrant according to claim 1, wherein the outer diameter of said valve body is smaller than the inner diameter of said outer bayonet ring.

11. The hydrant according to claim 1, wherein the inner diameter of said inner bayonet ring is smaller than the outer diameter of said valve body.

12. The hydrant according to claim 1, wherein said inner bayonet ring comprises axial grooves accommodating axial protrusions of said valve body to prevent mutual rotation between said inner bayonet ring and said valve body while allowing axial displacement of said valve body in relation to said inner bayonet ring.

13. The hydrant according to claim 1, wherein said outer bayonet ring is made from brass or bronze.

14. The hydrant according to claim 1, wherein said inner bayonet ring is made from brass or bronze.

15. The hydrant according to claim 1, wherein said hydrant is a dry barrel style hydrant.

16. The hydrant according to claim 1, wherein said hydrant housing comprises an upper barrel and a lower barrel and wherein said outer bayonet ring is rigidly connected to said lower barrel.

17. The hydrant according to claim 1, wherein said hydrant housing comprises an upper barrel, a lower barrel and an inlet base wherein said outer bayonet ring is rigidly connected to said inlet base.

18. The hydrant according to claim 1, wherein said outer bayonet ring is rigidly connected to said hydrant housing by being clamped between two or more parts of said hydrant housing.

19. The hydrant according to claim 18, wherein said hydrant housing comprises an upper barrel, a lower barrel and an inlet base wherein said outer bayonet ring is connected to said hydrant housing by being clamped between said lower barrel and said inlet base.

20. The hydrant according to claim 1, wherein said hydrant comprises an outlet nozzle arranged at one end of said hydrant housing, wherein said valve seat is arranged at an opposite end of said hydrant housing and wherein said valve seat is arranged on the side of said inner bayonet ring facing away from said end of said hydrant housing comprising said outlet nozzle.

21. A method for mounting a valve seat in a hydrant, said method comprising the steps of:
   connecting an outer bayonet ring to a hydrant housing of said hydrant,
   placing an inner bayonet ring comprising a valve seat in said outer bayonet ring, and
   rotating said inner bayonet ring in relation to said outer bayonet ring to connect said inner bayonet ring to said outer bayonet ring by way of a bayonet coupling.

22. The method for according to claim 21, wherein said method further comprises arranging a resilient member between said inner bayonet ring and said outer bayonet ring so that said resilient member forces a cam of an outer ring bayonet lug or an inner ring bayonet lug into engagement with a socket on the other of said outer ring bayonet lug or said inner ring bayonet lug when said bayonet coupling is fully engaged.

23. The method for according to claim 22, wherein said method further comprises compressing said resilient member while rotation said inner bayonet ring in relation to said outer bayonet ring.

24. The method for according to claim 21, wherein said method is performed on a hydrant according to claim 1.

* * * * *